(12) United States Patent
Aoki

(10) Patent No.: US 7,059,784 B2
(45) Date of Patent: Jun. 13, 2006

(54) PRINTING APPARATUS PERFORMING BIDIRECTIONAL COMMUNICATION WITH A SERVER AND AN INFORMATION TERMINAL

(75) Inventor: Kazuma Aoki, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/667,504

(22) Filed: Sep. 23, 2003

(65) Prior Publication Data

US 2004/0062585 A1    Apr. 1, 2004

(30) Foreign Application Priority Data

Sep. 30, 2002  (JP) .............................. 2002-285188

(51) Int. Cl.
*B41J 5/30* (2006.01)
*G06K 15/00* (2006.01)

(52) U.S. Cl. ...................................... 400/61; 358/1.14
(58) Field of Classification Search .................. 400/61; 358/1.14, 1.15, 1.1, 1.9, 1.11
See application file for complete search history.

(56) References Cited

U.S. PATENT DOCUMENTS

| | | | |
|---|---|---|---|
| 5,956,471 A | 9/1999 | Ueda et al. ................ 358/1.14 |
| 6,139,177 A * | 10/2000 | Venkatraman et al. ........ 700/83 |
| 6,256,668 B1 * | 7/2001 | Slivka et al. ................ 709/220 |
| 6,333,790 B1 * | 12/2001 | Kageyama .................. 358/1.15 |
| 6,775,023 B1 * | 8/2004 | Fukunaga et al. ......... 358/1.15 |
| 2002/0016836 A1 | 2/2002 | Suzuki et al. ................ 709/223 |
| 2003/0063744 A1 * | 4/2003 | Parry ........................... 380/51 |
| 2003/0081247 A1 * | 5/2003 | Sharma ..................... 358/1.15 |
| 2003/0090705 A1 * | 5/2003 | Ferlitsch .................... 358/1.15 |
| 2003/0097586 A1 * | 5/2003 | Mok .......................... 713/200 |
| 2003/0223093 A1 * | 12/2003 | Baird et al. ................ 358/1.15 |

FOREIGN PATENT DOCUMENTS

| | | |
|---|---|---|
| JP | 7-152520 | 6/1995 |
| JP | 2000-112691 | 4/2000 |
| JP | A 2002-14780 | 1/2002 |
| JP | 2002240400 | 8/2002 |

* cited by examiner

*Primary Examiner*—Hirshfeld Andrew Howard
*Assistant Examiner*—Wasseem H. Hamdan
(74) *Attorney, Agent, or Firm*—Oliff & Berridge, PLC

(57) ABSTRACT

A printing apparatus is connected to a WAN and a LAN and can perform a bidirectional communication with each terminal in those networks. In the printing apparatus, a CPU sends a Web server a request signal, which received from a LAN terminal, and receives content data sent from the web server as a response to the request signal. On the basis of a predetermined determination condition, the CPU determines whether to cause a printing unit to print the content data sent from the web server. If determining that the content data is to be printed, the CPU causes the printing unit to print the content data.

4 Claims, 6 Drawing Sheets

FIG. 5

| PRINT/DISPLAY COMMAND | GET REQUEST | REQUEST SOURCE IP ADDRESS |
|---|---|---|
| PRINT | GET/***/index.html HTTP/1.0 | 192.168.0.1 |

FIG. 6

| LAN TERMINAL ADDRESS | OPERATION MODE |
|---|---|
| 192.168.0.1 | WEB PRINT MODE ON |
| 192.168.0.2 | WEB PRINT MODE OFF |
| ⋮ | ⋮ |

PRINTING APPARATUS PERFORMING BIDIRECTIONAL COMMUNICATION WITH A SERVER AND AN INFORMATION TERMINAL

BACKGROUND OF THE INVENTION

1. Field of the Invention

The present invention relates to a printing apparatus that is used in such a manner as to be connected to both of a LAN (local area network) and a WAN (wide area network) such as the Internet. The present invention also relates to a printing system having the above configured printing apparatus and to a printing method for the above configured printing apparatus.

2. Description of the Related Art

Conventionally, there is known a printing system, as disclosed in JP-A-2002-014780 (particularly on page 6 and FIG. 1), having the following configuration. The conventional printing system is configured such that, when a printing apparatus receives a print request from a portable terminal, the printing apparatus communicates the print request to a server on the Internet. The printing apparatus then receives data sent from the server in response, and performs printing. In the above-configured conventional printing system, prior to the printing, the portable terminal directly acquires content information as a printing subject via a communication channel.

However, in the above-described conventional printing system, different communication methods are used in performing printing in response to a print request from the portable terminal and in causing content information for printing to be displayed on the screen of the portable terminal. In addition, accessing the Internet via the same route is not possible in the conventional printing system.

Further, in the above-described conventional printing system, a plurality of LAN terminals such as portable terminals and personal computers are not connected to the printing apparatus. Even if assumed that a plurality of LAN terminals are connected to the printing apparatus, the printing apparatus cannot handle the requests, such as printing requests, from the respective LAN terminals individually.

SUMMARY OF THE INVENTION

The present invention has been made to solve the above problems, and therefore an object of the present invention is to provide a printing apparatus that accesses data for different purposes via a same route and handles requests from respective LAN terminals individually.

In order to achieve the object, according to a first aspect of the invention, there is provided a printing apparatus connected to a first network and a second network and capable of performing a bidirectional data communication with a server computer connected to the first network and with an information terminal connected to the second network, including: a printing unit configured to print an image on a printing medium based on externally input data; a sending and receiving unit configured to send the server computer a request signal received from the information terminal and to receive content data sent, as a response to the request signal, from the server computer; a print execution determining unit configured to determine, on the basis of a predetermined determination condition, whether the content data is to be printed; and a print control unit configured to cause the printing unit to print the content data in a case where the print execution determining unit determines that the content data is to be printed.

According to a second aspect of the invention, there is provided a printing system including: a server computer connected to a first network and configured to receive a request signal and to send content data as a response to the request signal; an information terminal connected to a second network and configured to send the request signal; and a printer apparatus connected to the first network and the second network and capable of performing a bidirectional data communication with the server computer and the information terminal, wherein the printer apparatus including: a printing unit configured to print an image on a printing medium based on externally input data; a sending and receiving unit configured to send the server computer the request signal received from the information terminal and to receive the content data sent, as a response to the request signal, from the server computer; a print execution determining unit configured to determine, on the basis of a predetermined determination condition, whether the content data is to be printed; and a print control unit configured to cause the printing unit to print the content data in a case where the print execution determining unit determines that the content data is to be printed.

According to a third aspect of the invention, there is provided a printing method for a printing apparatus connected to a first network and a second network and capable of performing a bidirectional data communication with a server computer connected to the first network and with an information terminal connected to the second network, including: sending a request signal received from the information terminal to the server computer; receiving content data sent, as a response to the request signal, from the server computer; determining, on the basis of a predetermined determination condition, whether the content data is to be printed; and printing the content data on a printing medium in a case where the content data is determined to be printed.

According to the first, the second and the third aspect of the invention, when the print request is sent from the information terminal (LAN terminal), the printing apparatus can acquire the content data for printing from the server computer (web server) on the basis of the predetermined determination condition.

According to a fourth aspect of the invention, there is provided a printing apparatus connected to a first network and a second network and capable of performing a bidirectional data communication with a server computer connected to the first network and with an information terminal connected to the second network, including: a printing unit configured to print an image on a printing medium based on externally input data; a sending and receiving unit configured to send a request signal received from the information terminal and to receive content data sent, as a response to the request signal, from the server computer; a request signal interpreting unit configured to interpret contents of the request signal and to determine whether a print request is included in the request signal; a print control unit configured to cause the printing unit to print the content data in a case where the request signal interpreting unit determines that the print request is included in the request signal; and a data sending unit configured to send the content data to the information terminal that sent the request signal in a case where the request signal interpreting unit determines that the print request is not included in the request signal.

According to a fifth aspect of the invention, there is provided a printing system including: a server computer connected to a first network and configured to receive a request signal and to send content data as a response to the request signal; an information terminal connected to a second network and configured to send the request signal; and a printer apparatus connected to the first network and the second network and capable of performing a bidirectional data communication with the server computer and the information terminal, wherein the printer apparatus including: a printing unit configured to print an image on a printing medium based on externally input data; a sending and receiving unit configured to send the server computer the request signal received from the information terminal and to receive the content data sent, as a response to the request signal, from the server computer; a request signal interpreting unit configured to interpret contents of the request signal and to determine whether a print request is included in the request signal; a print control unit configured to cause the printing unit to print the content data in a case where the request signal interpreting unit determines that the print request is included in the request signal; and a data sending unit configured to send the content data to the information terminal that sent the request signal in a case where the request signal interpreting unit determines that the print request is not included in the request signal.

According to a sixth aspect of the invention, there is provided a printing method for a printing apparatus connected to a first network and a second network and capable of performing a bidirectional data communication with a server computer connected to the first network and with an information terminal connected to the second network, including: sending a request signal received from the information terminal to the server computer; receiving content data sent, as a response to the request signal, from the server computer; determining whether a print request is included in the request signal by interpreting contents of the request signal; printing the content data on a printing medium in a case where the print request is included in the request signal; and sending the content data to the information terminal that sent the request signal in a case where the print request is not included in the request signal.

According to the fourth, the fifth and the sixth aspect of the invention, even when a request other than the print request is sent from the information terminal, target content data corresponding to the request can be acquired from the server computer. That is, data processing suitable for each of various requests can be performed. Therefore, it becomes possible to access the server computer via the printing apparatus for different purposes.

According to a seventh aspect of the invention, there is provided a printing apparatus connected to a first network and a second network and capable of performing a bidirectional data communication with a server computer connected to the first network and with an information terminal connected to the second network, including: a printing unit configured to print an image on a printing medium based on externally input data; a sending and receiving unit configured to send the server computer a request signal received from the information terminal and to receive content data sent, as a response to the request signal, from the server computer; a mode setting unit configured to set, for the information terminal, one of a print mode in which the content data is set to be printed by the printing unit and a non-print mode in which the content data is set not to be printed by the printing unit; and a data sending unit configured to send the content data to the information terminal that sent the request signal in a case where the non-print mode is set by the mode setting unit.

According to an eighth aspect of the invention, there is provided a printing system including: a server computer connected to a first network and configured to receive a request signal and to send content data as a response to the request signal; an information terminal connected to a second network and configured to send the request signal; and a printer apparatus connected to the first network and the second network and capable of performing a bidirectional data communication with the server computer and the information terminal, wherein the printer apparatus including: a printing unit configured to print an image on a printing medium based on externally input data; a sending and receiving unit configured to send the server computer a request signal received from the information terminal and to receive content data sent, as a response to the request signal, from the server computer; a mode setting unit configured to set, for the information terminal, one of a print mode in which the content data is printed by the printing unit and a non-print mode in which the content data is not printed by the printing unit; and a data sending unit configured to send the content data to the information terminal that sent the request signal in a case where the non-print mode is set by the mode setting unit.

According to a ninth aspect of the invention, there is provided a printing method for a printing apparatus connected to a first network and a second network and capable of performing a bidirectional data communication with a server computer connected to the first network and with an information terminal connected to the second network, including: setting, for the information terminal, one of a print mode in which content data is set to be printed and a non-print mode in which the content data is set not to be printed; sending a request signal received from the information terminal to the server computer; receiving the content data sent, as a response to the request signal, from the server computer; sending the content data to the information terminal that sent the request signal in a case where the non-print mode is set.

According to the seventh, the eighth and the ninth aspect of the invention, target data can be acquired from the server computer in response to not only a request from the information terminal for which the print mode is set but also a request from the another information terminal for which the non-print mode is set. That is, data processing suitable for the setting mode of each of the information terminals can be performed. Therefore, it becomes possible to access the server computer via the printing apparatus even in the case where different setting modes are set for the respective information terminals; requests from a plurality of the information terminal can be handled individually.

BRIEF DESCRIPTION OF THE DRAWINGS

The above and other objects and advantages of the present invention will become more fully apparent from the following detailed description taken with the accompanying drawings, in which:

FIG. 5 is an explanatory drawing showing an example of request information;

FIG. 6 is an explanatory drawing showing an example of a setting mode management table.

DETAILED DESCRIPTION OF THE PREFERRED EMBODIMENTS

Referring now to the accompanying drawings, a description will be given in detail of preferred embodiments of the invention.

Figure 1:
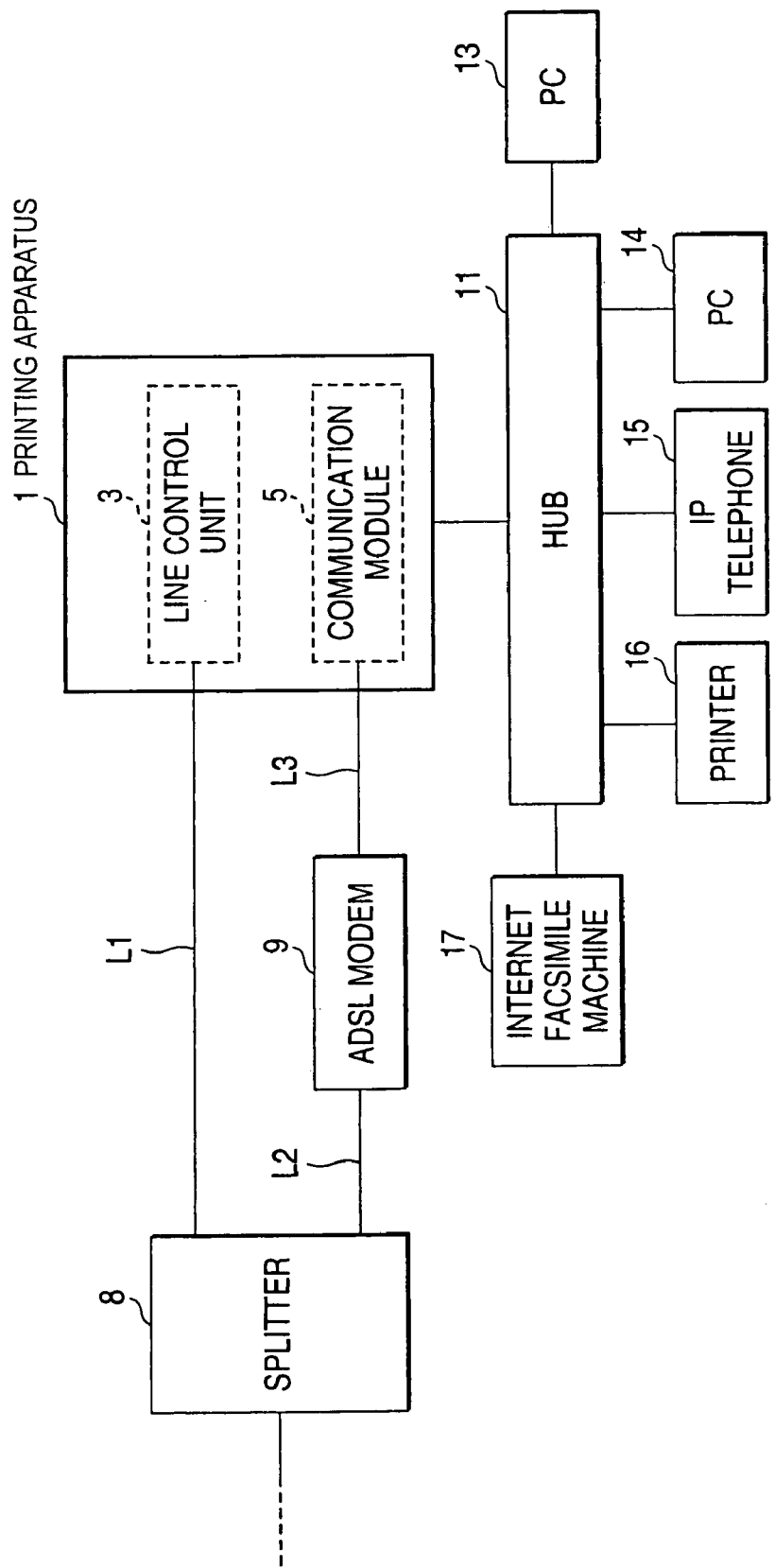
FIG. 1 is a block diagram showing a printing system according to a first embodiment of the invention.

FIG. 1 is a block diagram showing a printing system, having a printing apparatus, according to a first embodiment of the invention.

Figure 2:
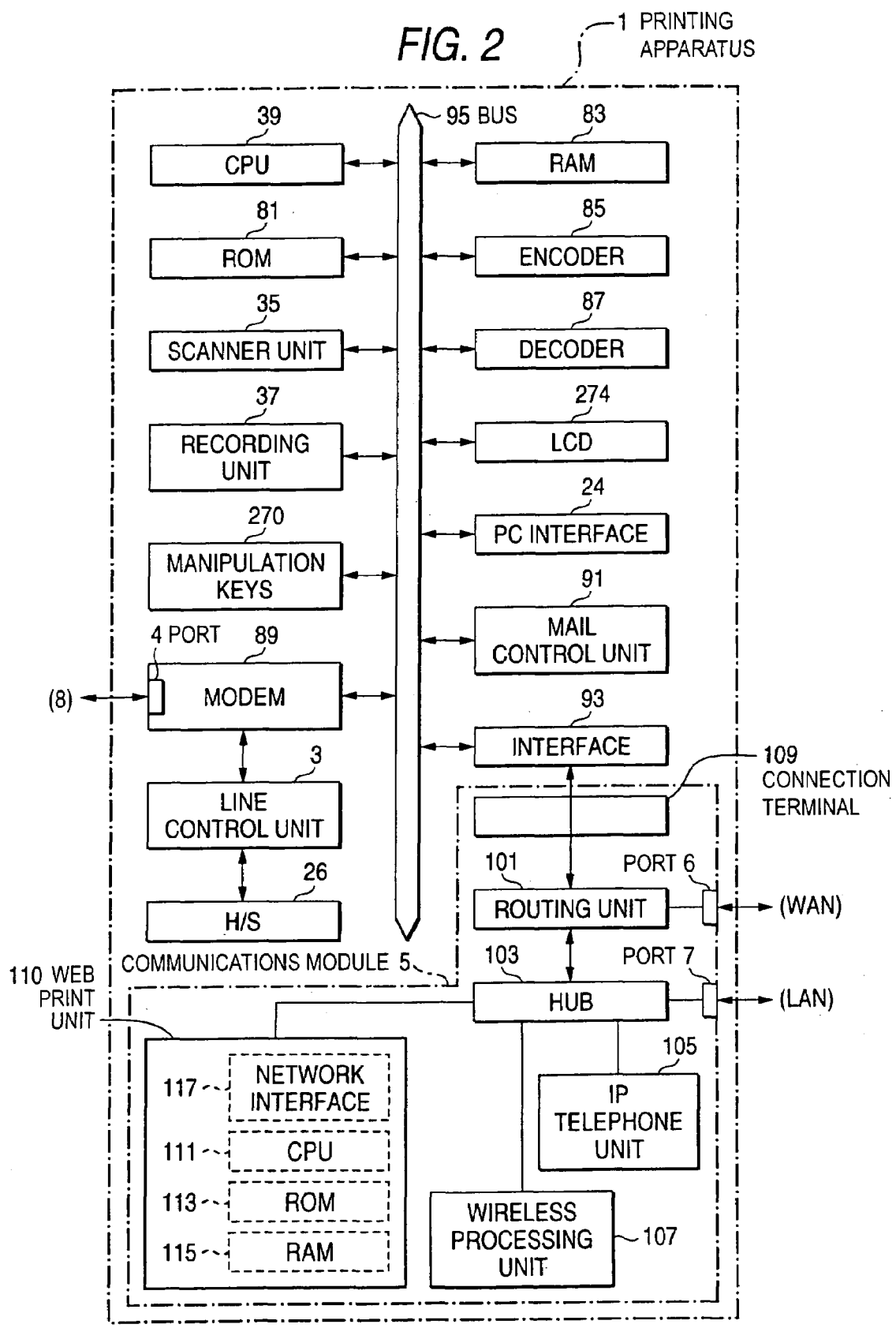
FIG. 2 is a block diagram showing an electrical configuration of the printing apparatus according to the embodiment.

As shown in FIG. 1, the printing apparatus 1 is equipped with a line control unit 3 and a communication module 5. The line control unit 3, as will be described hereinafter referring to FIG. 2, is connected to a modem 89, which has an external connection port 4 (see FIG. 2). An analog line L1 (e.g., a telephone line (having two or four cores)) is connected to the external connection port 4. The analog line L1 is also connected, at the other end, to a telephone connection port of a splitter 8, which is installed in a building (e.g., a house or an office).

The communication module 5, as will also be described hereinafter referring to FIG. 2, has a WAN-side connection port 6 and a LAN-side connection port 7. Here, "WAN" is an abbreviation for "wide area network" and "LAN" is an abbreviation for "local area network". The WAN-side connection port 6 is connected to a WAN such as the Internet via a LAN cable L3, an ADSL modem 9, a LAN cable L2 and the splitter 8. The LAN-side connection port 7 is connected to a hub 11.

The hub 11 is also connected to a plurality of LAN terminals (information terminals) 13–17. As the LAN terminal 13–17, in the embodiment, there is provided a plurality of PCs 13 and 14 capable of bidirectional communication, a printer 16 (e.g., an ink jet printer, a laser printer, or the like capable of network connection), an IP telephone 15 capable of sending and receiving an audio signal over the IP (Internet protocol) scheme, and an Internet facsimile machine 17 capable of accessing the Internet. The hub 11 is connected to a local area network (LAN) in the building that consists of the LAN terminals 13–17.

The splitter 8, which is a known splitter that is used for ADSL (Asymmetric Digital Subscriber Line), splits, into a first signal in a frequency range of about 4 kHz or less and a second signal for ADSL in a higher frequency range than the first signal, a transmission signal in which the first signal and the second signal is superimposed on each other and is transmitted from another splitter (not shown) installed in a base station. The splitter 8 outputs the first signal and the second signal from the telephone connection port and an ADSL modem connection port, respectively. The splitter 8 superimposes signals input via the respective connection ports and sends a resulting signal to the splitter in the base station.

As described above, the printing apparatus 1 according to the first embodiment is configured to be connectable to a subscriber telephone in a public network (i.e., a public switched telephone network: PSTN) and to the Internet as a wide area network (WAN) via the communication module 5 and the ADSL modem 9.

The printing apparatus 1, through operation of a routing unit 101 (which will be described later) of the communication module 5, functions as a router for routing data (IP packets) that are exchanged between a server computer (e.g., a web server) connected to the Internet and the LAN terminals 13–17 connected to the LAN.

The printing apparatus 1 is equipped with a printer function and a copier function as well as an ordinary function (facsimile function) of optically reading an image on an original document and converting resulting image data into facsimile data or forming, on a recording sheet, an image on the basis of facsimile data transmitted via the analog line L1.

The printer function is a function of forming an image, on a recording sheet, on the basis of code data that is sent from PCs 13 and 14 and a word processor (not shown) connected to the LAN. When the code data is received from a PC connected to the printing apparatus 1 via a PC interface (PC I/F) 24 thereof, or from the PCs 13 or 14 or some other device in the LAN via the communication module 5, the printing apparatus 1 forms an image based on the code data on a recording sheet. The copier function is a function of reading an image from an original document and forming an image on a recording sheet on the basis of resulting image data using a scanner unit 35 and a printing unit 37 (both described later).

Hereinafter, the electrical configuration of the printing apparatus 1 will be described. FIG. 2 is a block diagram showing the electrical configuration of the printing apparatus 1 according to the first embodiment.

The printing apparatus 1 mainly includes a CPU 39, a ROM 81, a RAM 83, a scanner unit 35, an encoder 85, a printing unit 37, a decoder 87, manipulation keys 270, an LCD 274, a modem 89, the line control unit 3, the PC interface (PC I/F) 24, a mail control unit 91, and a function expansion interface 93, which are connected to each other via a bus 95. The communication module 5 is connected to the function expansion interface 93.

The CPU 39 is the control core of the printing apparatus 1 and controls the entire printing apparatus 1 in a unified manner. For example, the CPU 39 reads out a program for control processing from the ROM 81, and according to the program, the CPU 39 sends and receives facsimile data or performs printing.

Facsimile function programs that are necessary for the apparatus 1 to operate as a facsimile machine are stored in the ROM 81. For example, a reception program for causing the printing unit 37 to form an image on the basis of facsimile data received from an external facsimile machine by the line control unit 3 is stored in the ROM 81 as part of the facsimile function programs.

Printer function programs that are necessary for the apparatus 1 to operate as a printer that prints data transmitted from a PC connected to the WAN or to the LAN or the like are also stored in the ROM 81. For example, a PC print program for causing the printing unit 37 to form an image on the basis of data received from a PC connected to the WAN or the PC 13 or 14 in the LAN by the communication module 5 is stored in the ROM 81 as part of the printer function programs.

In the ROM 81, there are further stored a printing unit control program that is called by the above programs, other various programs, and various data that are necessary during execution of those programs. The RAM 83 functions as a work memory that is necessary in performing any of various controls, a transmission/reception data storage area for storing various pieces of data such as facsimile data, and a table storage area for storing a table relating to IP addresses that are assigned to the PCs 13 and 14 in the LAN.

The scanner unit 35 is to read an original document in sending facsimile data or copying the original document.

The encoder 85 encodes image data produced by the scanner unit 35 into image data of a facsimile format such as a G3 compression format and outputs the encoded image data. The decoder 87 decodes facsimile-format image data into image data that can be processed by the printing unit 37.

The printing unit 37 is configured so as to function as a color laser printer capable of forming a color image. According to instructions from the CPU 39 that executes the printing unit control program, the printing unit 37 prints, on a recording sheet, a color image on the basis of image data decoded by the decoder 37 and outputs a printed recording sheet.

The manipulation keys 270, which are provided on an operating panel (not shown) of the printing apparatus 1, are used for inputting an instruction signal for any of various processing manipulations to the CPU 39 in accordance with a manipulation of a user.

The LCD 274, which is also provided on the operating panel, is a display unit for displaying various messages such as an error message and a message that explains a manipulation procedure to a user. Having a touch panel function, the LCD 274 of the first embodiment displays a one-touch key when an input manipulation is necessary and acquires manipulation information when the one-touch key is pressed by the user and sends the manipulation information to the CPU 39.

The modem 89 exchanges the facsimile data with an external facsimile machine connected to the public network, via the line control unit 3 and the splitter 8. The line control unit 3 sends a dialing signal to the public network, responds to a call signal from the public network, and performs other operations. For example, the line control unit 3 connects the printing apparatus 1 itself to an external facsimile apparatus via the public network in such a manner that they can communicate with each other.

The PC interface 24 connects a PC to the printing apparatus 1 via a parallel cable or the like. For example, the PC interface 24 receives code data from a PC connected thereto. The mail control unit 91 exchanges with the server computer connected to the Internet, and is capable of sending and receiving the facsimile data by the E-mail.

The function expansion interface (hereinafter, referred to simply as "I/F") 93 is a serial interface such as an AIO (analog input/output) interface or a RS-232C interface that is configured in such a manner that the communication module 5 having a separate routing unit 101 can be connected thereto in a detachable manner.

The communication module 5 is equipped with the routing unit 101, a hub 103, an IP telephone unit 105, a wireless processing unit 107, a web print unit 110, an interface connection terminal 109 that is connected to the routing unit 101. The communication module 5 is connected to the function expansion interface 93 via the interface connection terminal 109.

The routing unit 101 exchanges IP packets with the server computer connected to the Internet via the ADSL modem 9, and functions as a broadband router having the known IP masquerade function and routing function. The routing unit 101 converts, using the masquerade function, a private IP address used in the LAN and a global IP address used in the WAN (in this embodiment, Internet) into each other. Using the routing function, the routing unit 101 connects the LAN terminals 13–17 in the LAN and the server computer (such as a web server) in the WAN in such a manner that a bidirectional communication can be performed between the LAN terminals 13–17 and the server computer.

The routing unit 101 sends and receive data, via the hub 103, to and from the ADSL modem 9, the IP telephone unit 105, the wireless processing unit 107, and the web print unit 110, thereby connecting the above units disposed within the communication module 5 to the Internet in such a manner that a bidirectional communication can be performed.

The routing unit 101, by communicating the LAN terminals 13–17 in the LAN via the hub 103, connects the LAN terminals 13–17 in the LAN to the Internet in such a manner that a bidirectional communication can be performed between the LAN terminals 13–17 and the server computer. For example, the routing unit 101 sends data received from a web server (server computer) in the Internet to a designated LAN terminal among the LAN terminals 13–17 by performing a route control.

The routing unit 101 is also configured so as to communicate with the CPU 39 via the function expansion interface 93, whereby the LAN terminals 13–17, IP telephone unit 105, the wireless processing unit 107, and the web print unit 110 performs a bidirectional communication with the CPU 39 via the routing unit 101 and the function expansion interface 93. In the printing apparatus 1, when the CPU 39 receives code data for printing from the PC 13 or 14 in the LAN via the routing unit 101, the CPU 39 executes the printer function program and causes the printing unit 37 to form an image on the basis of the code data by controlling the printing unit 37.

The IP telephone unit 105, which is connected to the routing unit 101 via the hub 103, is configured so as to perform an audio communication (i.e., making a telephone call) with an external IP telephone over the Internet by converting an audio signal into IP packets which is digital data. The wireless processing unit 107, which enables a wireless communication between the printing apparatus 1 and an external wireless information terminal (not shown), is configured so as to connect the external wireless information terminal to individual sections of the printing apparatus 1 in such a manner that a bidirectional communication can be performed between the external wireless information terminal and each of the individual section of the printing apparatus 1 according to the Bluetooth standard (a standard for short-distance wireless communication) or the IrDA standard (a standard for infrared communication). As described above, the printing apparatus 1 is configured so as to be connectable with each of the LAN terminals 13–17 by a fixed connection cable via the connection port 7 connected to the hub 103, and to be connectable wirelessly via the wireless processing unit 107.

The web print unit 110 is also equipped with a CPU 111, a ROM 113, a RAM 115 and a network interface 117. The web print unit 110 is configured so as to be connectable to the Internet and to communicate with the CPU 39, by communicating with the routing unit 101 via the network interface 117.

The ROM 113 stores web print function programs of various processes (described later) for acquiring data from the web server or for causing the printing unit 37 of the printing apparatus 1 to print data downloaded from the web server, flag information representing operation conditions during operation of a web print function accomplished by the web print function programs, and other information.

More specifically, the web print unit 110 has a print function of causing the printing unit 37 to print an image on the basis of data downloaded from the web server via the routing unit 101, a storage function of temporarily storing data in the RAM 115, a printer transfer function of transferring downloaded data to the printer 16 designated to be transferred, in the LAN via the LAN-side connection port 7, a PC transfer function of transferring downloaded data to the PCs 13 or 14 in the LAN via the LAN-side connection port 7, a log storage function of storing log information relating to each operation performed by the web print unit 110, and an error information display function of displaying an error message on the LCD 274. The above functions are accomplished by the web print function programs stored in the ROM 113. Which of these functions should be performed (i.e., on/off of each function) is determined on the basis of the flag information.

The CPU 111 of the communication module 5 serves to implement: a sending and receiving unit for sending the web server connected to the WAN a request signal received from one of the LAN terminals 13–17, and for receiving content data sent from the web server as a response signal to the request signal; a print execution determining unit for determining, on the basis of a predetermined determination condition, whether the content data sent from the web server and received by the sending and receiving unit should be printed; and a print control unit for causing a printing unit to print the content data received by the sending and receiving unit when the print execution determining unit determines that the content data received by the sending and receiving unit should be printed.

The CPU 111 also serves to implement: a request signal interpreting unit for interpreting the contents of the request signal received from one of the LAN terminals 13–17 to determine whether the request signal is a print request; a print control unit for performing the print operation on the basis of the content data sent from the web server and received by the sending and receiving unit when the request signal interpreting unit determines that the request signal is a print request; and a data sending unit for sending the content data received by the sending and receiving unit to the LAN terminal that issued the request signal when the request signal interpreting unit determines that the request signal is not a print request.

Further, the CPU 111 serves to implement: a mode setting unit capable of setting, for each of the LAN terminals, one of a print mode in which the content data sent from the web server and received by the sending and receiving unit is printed by the printing unit and a non-print mode in which the content data is not printed by the printing unit; and a data sending unit for sending the content data received by the sending and receiving unit to the LAN terminal that issued the request signal when the mode that has been set by the mode setting unit is the non-print mode.

Hereinafter, an example of the operation of the printing apparatus 1 will be described in detail.

Figure 3:
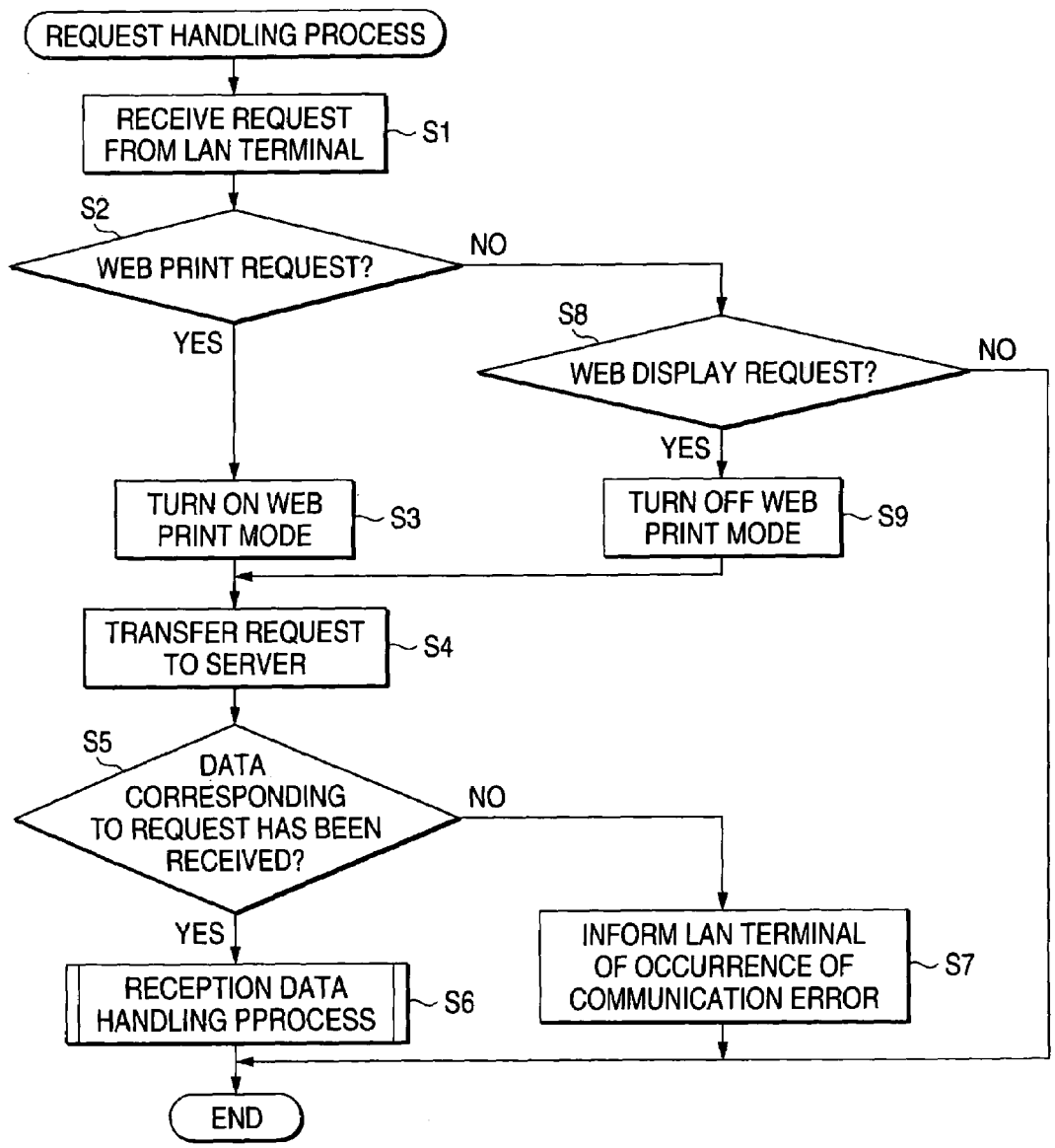
FIG. 3 is a flowchart showing a request handling process executed in the printing apparatus.
Figure 4:
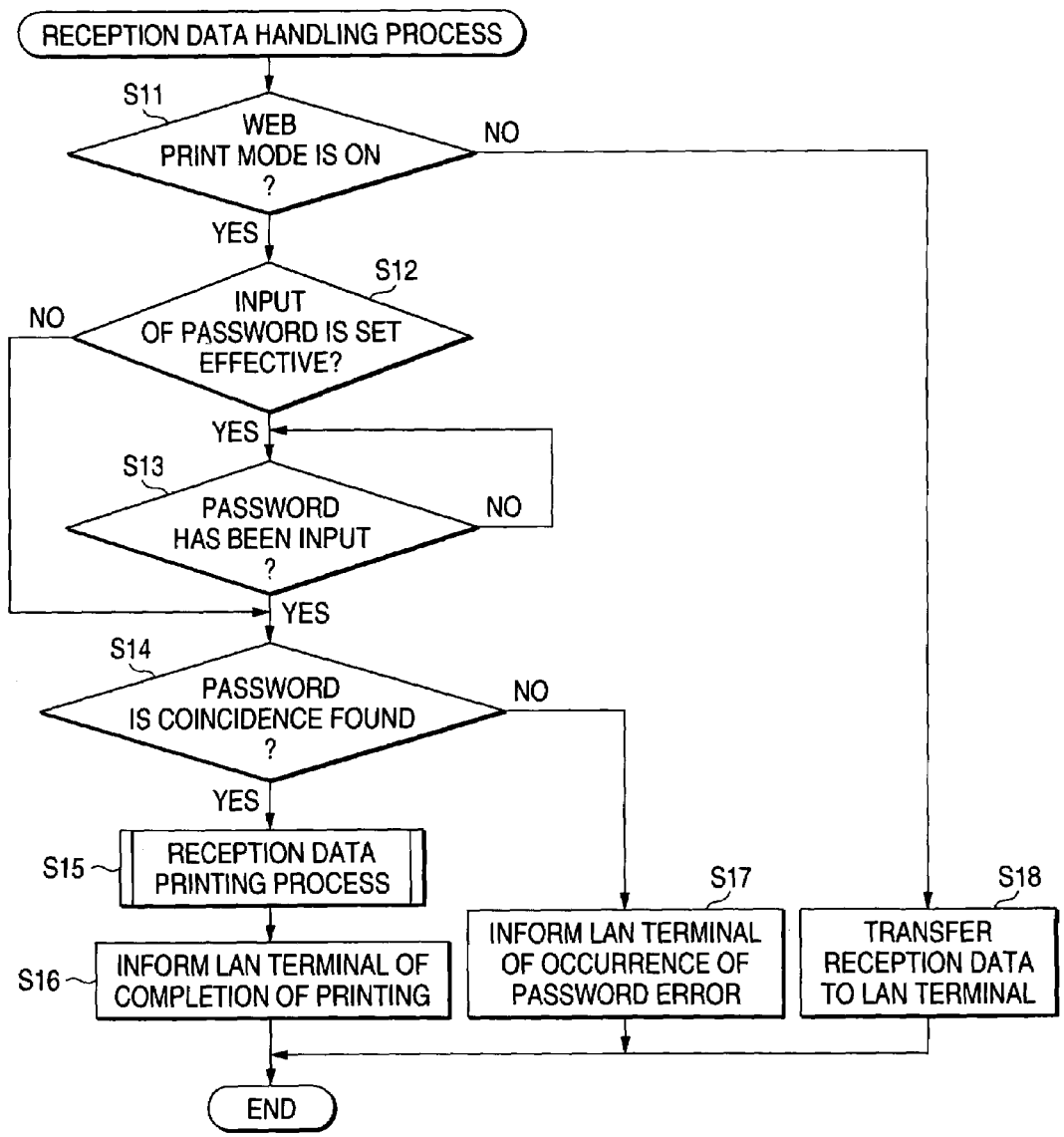
FIG. 4 is a flowchart showing a reception data handling process included in the request handling process.

FIG. 3 is a flowchart showing a request handling process that is executed in the printing apparatus 1. FIG. 4 is a flowchart showing a reception data handling process that is included in the request handling process. FIG. 5 shows an example of request information.

As shown in FIG. 3, when receiving request information for a web server from one of the LAN terminals 13–17 (step S1), the CPU 111 interprets the request information to determine whether the request information includes a web page print request (step S2).

As exemplified in FIG. 5, the request information has a frame structure including a GET request in which a GET command and a communication protocol version are described in a header portion and a footer portion, respectively, an IP address of a request issuance source, and a print/display command indicating whether the request information is a print request or a display request.

If the request information includes a print request (YES in step S2), the CPU 111 turns on the web print mode as a preparation for a later operation (step S3).

The CPU 111 then transfers the request information received from the LAN terminal to the web server via the routing unit 101 (step S4). Content data corresponding to the request information is sent from the web server that has received the request information to the printing apparatus 1 over the Internet. The request information is exchanged according to HTTP (hypertext transfer protocol) as a communication protocol for the Internet.

When the data sent from the web server in response to the request signal is received (YES in step S5), the CPU 111 executes a reception data handling process (step S6), which will be described later.

If no response to the request information has been received from the web server and hence the CPU 111 has not received target content data (NO in step S5), the CPU 111 informs the LAN terminal as the request source of occurrence of a communication error (step S7). As a result, an alert indicating that the data download has failed is displayed on the screen of the LAN terminal. To inform the LAN terminal of occurrence of the communication error, the CPU 111 may send either display data of a web page format or a command to the LAN terminal.

If the print request is not included in the request information (NO in step S2), the CPU 111 interprets the request information to determine whether the request information includes a display request indicating a request to display the web page (step S8).

If the display request is included in the request information (YES in step S8), the CPU 111 turns off the web print mode as a preparation for a later operation (step S9) and proceeds to step S4.

If the display request is not included in the request information (NO in step S8), the CPU 111 finishes the execution of the request handling process.

In the reception data handling process of step S6, as shown in the flowchart of FIG. 4, if the web print mode is on (YES in step S11), the CPU 111 checks whether input of a password is set effective (step S12).

If input of a password is set effective (YES in step S12), the CPU 111 waits until a password is input by the user (NO in step S13). If a password is input (YES in step S13), the CPU 111 verifies the input password with a password that was registered in advance (step S14). The password may be input through the LAN terminal or by directly manipulating the manipulation keys 270 of the printing apparatus 1. The user can register a password in the RAM 115, for example, in advance.

If the input password is verified with the registered password (YES in step S14), the CPU 111 causes the printing unit 37 to execute the reception data printing process (step S15). In the reception data printing process, the CPU 111 converts the web page that has been sent in response to the print request and stored in the RAM 115 into print data and the printing unit 37 performs printing on the basis of the print data.

Upon completion of the reception data printing process, the CPU 111 informs of the completion to the LAN terminal that requested the process (step S16). As a result, a message indicating that the target web page has been printed without any errors is displayed on the screen of the LAN terminal. To inform the LAN terminal of the completion of the reception data printing process, the CPU 111 may send either display data of a web page format or a command to the LAN terminal.

If the input password is invalid (NO in step S14), the CPU 111 informs of occurrence of a password error to the LAN terminal that requested the process (step S17). As a result, a message indicating that the target data could not be printed properly because of a password error is displayed on the screen of the LAN terminal. In this case, an application window that urges the user to re-input the password may be displayed on the screen of the LAN terminal.

If input of a password is not set effective (NO in step S12), the CPU 111 proceeds to step S15.

If the web print mode is off (NO in step S11), the CPU 111 transfers, as display data, the web page stored in the RAM 115 to the request source LAN terminal (step S18).

As described above, the printing apparatus 1 according to the first embodiment acquires a target web page (content data) from a web server in response to a print request and the display request from any of the LAN terminals. 13–17, and performs data processing suitable for each request. Therefore, it becomes possible to access a web page provided on a web server in the Internet via the printing apparatus 1 for different purposes such as printing and display, and to handle requests from the LAN terminals 13–17 individually.

When a web page is downloaded in response to a print request, the web page is processed directly by the printing apparatus 1 as print data. Therefore, it is not necessary for each of the LAN terminals 13–17 to have a printer driver.

Since a web page that has been downloaded in response to a print request does not go through the LAN, the traffic of the LAN can be reduced.

Since a web page that has been acquired in response to a print request is not transmitted to the LAN terminals 13–17, a copy protection can easily be realized for a web page for ticket printing and a web page including copyrighted digital content. In this connection, a safer system can be constructed by incorporating a mechanism that allows printing for only a person for whom printing is permitted by a print permission control using a password.

Hereinafter, a second embodiment according to the invention will be described. The second embodiment is almost the same as the first embodiment in the configuration shown in FIGS. 1 and 2 and the reception data handling process shown in FIG. 4. Therefore, only differences between the first and the second embodiments will be described below.

One difference in system configuration from the first embodiment is such that the printing apparatus 1 according to the second embodiment does not have the function of interpreting the contents of a request each time and, instead, a setting mode management table is stored in the RAM 115.

FIG. 6 illustrates an example of the setting mode management table. As exemplified in FIG. 6, the setting mode management table includes each of IP addresses of the LAN terminals 13–17 together with information indicating whether the web print mode is set to "on" or "off" in each of the LAN terminals 13–17. The user can make setting as to whether to set the web print mode to "on" or "off" in advance, that is, before a request is issued from the LAN terminals 13–17. A default setting is such that the web print mode is set to "off." The user can change the web print mode on/off setting by manipulating any of the LAN terminals 13–17 or the manipulation keys of the printing apparatus 1.

Figure 7:
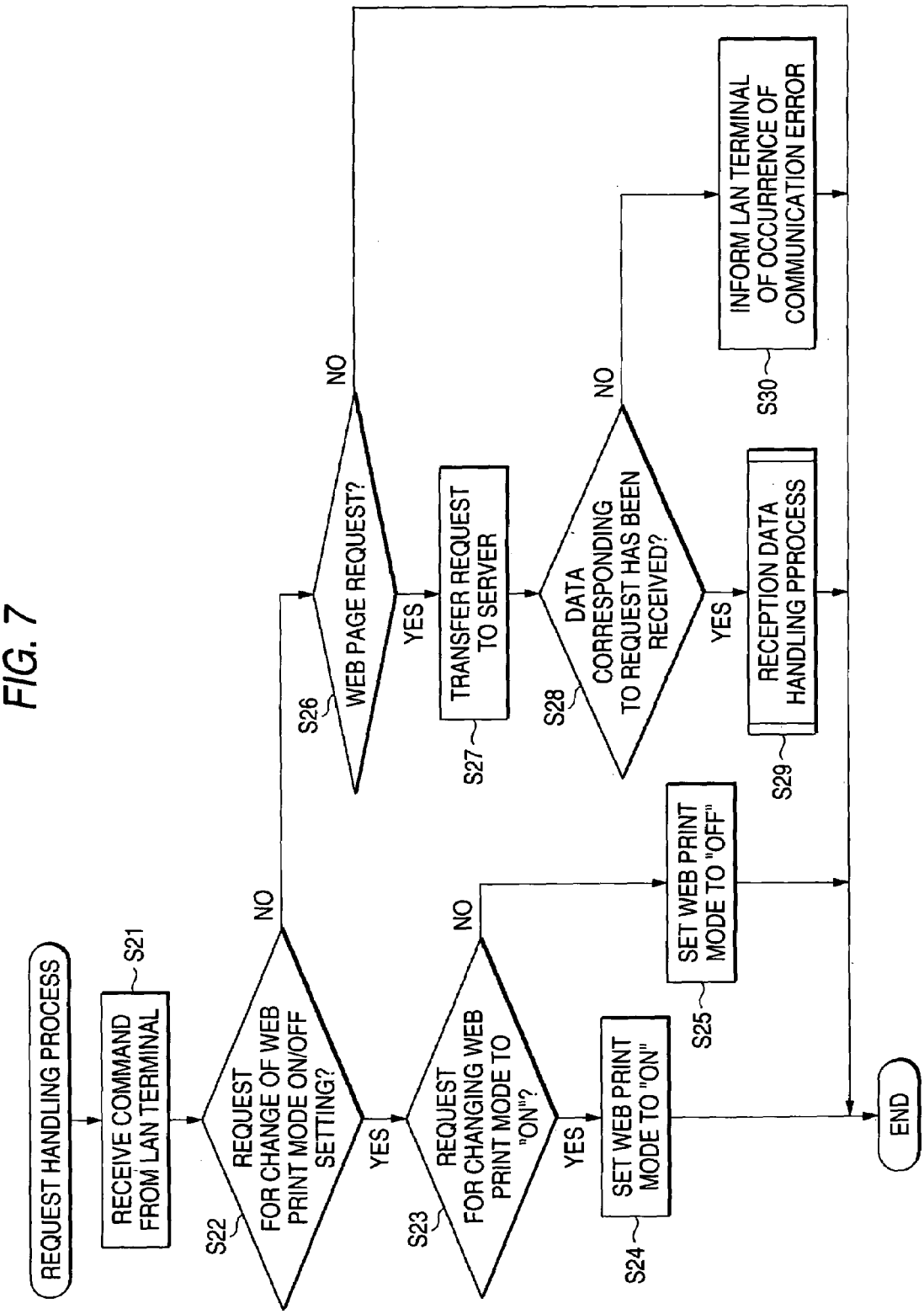
FIG. 7 is a flowchart showing a request handling process according to a second embodiment of the invention.

FIG. 7 is a flowchart showing a request handling process according to the second embodiment. In the second embodiment, a request issued from the LAN terminals 13–17 is sent to the printing apparatus 1 in the form of a standard command of HTTP or the like but an instruction to change the web print mode on/off setting is handled as an independent command.

When a certain command from one of the LAN terminals 13–17 is received (step S21), the CPU 111 determines whether the content of the received command is such as to request to change the on/off setting of the web print mode (step S22).

If the contents of the received command includes the request to change the on/off setting of the web print mode (YES in step S22), the CPU 111 checks whether the web print mode is requested to be changed to "on" (step S23).

If the web print mode is requested to be changed to "on" (step S23), the CPU 111 rewrites the content of the settings of the setting mode management table so that the web print mode of the LAN terminal that sent the command becomes "on" (step S24). If the web print mode concerned is already set to "on", the contents of the settings of the setting mode management table are not rewritten and are maintained as they are.

If the web print mode is requested to be changed to "off" (NO in step S23), the CPU 111 rewrites the contents of the settings of the setting mode management table so that the web print mode of the LAN terminal that sent the command becomes "off" (step S25). If the web print mode concerned is already set to "off," the contents of the settings of the setting mode management table are not rewritten and are maintained as they are.

If the received command includes no request of changing on/off setting of the web print mode (NO in step S22) but includes a request to download a web page (YES in step S26), the CPU 111 transfers, as a request, a standard command according to HTTP or the like that has been received via the routing unit 101 to a web server over the Internet (step S27). Content data corresponding to the request is sent from the web server that has received the request to the printing apparatus 1 over the Internet.

When the data sent from the web server in response to the request is received (YES in step S28), the CPU 111 supplies the content data to the routing unit 101, which executes the reception data handling process in the same manner as shown in the flowchart of FIG. 4 (step S29).

If no response to the request has been received from the web server and hence the CPU 111 has not received the target content data (NO in step S28), the CPU 111 informs the LAN terminal that sent the request of occurrence of a communication error (step S30). As a result, information indicating that the data download has failed is displayed on the screen of the LAN terminal. To inform the LAN terminal of occurrence of the communication error, the CPU 111 may send either display data of a web page format or a command.

If the received command includes no request for downloading a web page (NO in step S26), the CPU 111 finishes the execution of the request handling process.

As described above the printing apparatus 1 according to the second embodiment acquires a target web page from a web server in response to a request from the LAN terminal for which the web print mode is set to "on" (for instance, the Internet facsimile machine 17) and in response to a request from the LAN terminal for which the web print mode is set to "off" (for instance, the PC 13 or 14). Whereas the Internet facsimile machine 17 can cause the printing apparatus 1 to print the web page, the PC 13 or 14 can display the web page on the monitor screen. Needless to say, the web page can be displayed on the screen of the PC 13 or 14 if the web print mode of the PC 13 or 14 is set to "off," and the web page can be printed by the printing apparatus 1 in response to a request from the PC 13 or 14 if the web print mode of the PC 13 or 14 is set to "on".

In short, by properly setting the web print mode into "on" or "off" in advance for each of the LAN terminals 13–17, the user can always use specific LAN terminal (for instance, the PCs 13 and 14) as a terminal to display a web page and use the specific LAN terminal (for instance, the Internet facsimile machine 17) merely as a manipulation terminal for specifying print data.

In the other respects, the second embodiment provides the same advantages as the first embodiment does.

Although specific embodiments of the invention are described above, the invention is not limited to the above embodiments.

The LAN terminals are not limited to the PCs 13 and 14 and the Internet facsimile machine 17, and may be a PDA (personal digital assistant), a cellular phone, a video game machine having an Internet connection function.

The network that connects the LAN terminals and the printing apparatus 1 is not limited to a LAN connected with IP protocols and may be a connection with other protocols such as USB (universal serial bus).

A preferred example of the printing apparatus 1 is a network-ready printer. However, the printing apparatus 1 may be a multifunctional printer having a plurality of functions such as facsimile communication function, a copier function, an e-mail sending/receiving function.

In the reception data handling process shown in FIG. 4, input of a password is set effective or non-effective in advance, whereby a security measure for accessing the Internet is taken. However, input of a password is not indispensable.

According to the printing apparatus of the invention, when the print request is issued by the LAN terminal, the content data for printing can be acquired from the Web server on the basis of the predetermined determination condition.

According to the printing apparatus of the invention, even when a request other than the print request is issued by the LAN terminal, target content data corresponding to the request can be acquired from the Web server. That is, data processing suitable for each of various requests can be performed. Therefore, it becomes possible to access the Web server via the printing apparatus for different purposes.

According to the printing apparatus of the invention, target data can be acquired from the web server in response to not only a request from the LAN terminal for which the print mode is set but also a request from the LAN terminal for which the non-print mode is set. That is, data processing suitable for the setting mode of each LAN terminal can be performed. Therefore, it becomes possible to access the Web server via the printing apparatus even in the case where different setting modes are set for the respective LAN terminals; requests from LAN terminals can be handled individually.

According to the printing apparatus of the invention, there is provided an advantage that whether to print the content data can be determined on the basis of whether the request signal received from the LAN terminal contains the print command.

According to the printing apparatus of the invention, there is provided an advantage that setting can be made to the print mode or the non-print mode for each of the LAN terminals by using IP addresses thereof and the mode table.

According to the printing apparatus of the invention, there is provided an advantage that the contents of the mode table showing the corresponding relationship between the IP addresses and the print modes can be changed in accordance with a manipulation on the LAN terminal.

According to the printing apparatus of the invention, there is provided the following advantages. When a request other than the print request, say, a display request, is issued by the LAN terminal, content data for display corresponding to the display request can be acquired from the Web server. The content data can be transferred to the request source LAN terminal.

According to the printing apparatus of the invention, there is provided the following advantages. Where the authentication setting has been made by a person who operates the apparatus, the image based on the content data can be printed only when the password that is input through the LAN terminal coincides with the pre-stored password.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A printing apparatus connectable to a first network and a second network and capable of performing a bidirectional data communication with a server computer connected to the first network and with an information terminal connected to the second network, comprising:

a printing unit configured to print an image on a printing medium based on externally input data;

a sending and receiving unit configured to send the server computer a request signal received from the information terminal and to receive content data sent, as a response to the request signal, from the server computer;

a print execution determining unit configured to determine, on the basis of a determination condition, whether the content data is to be printed; and a print control unit configured to cause the printing unit to print the content data in a case where the print execution determining unit determines that the content data is to be printed.

2. The printing apparatus as claimed in claim 1, wherein the print control unit performs a control for printing only in a case where a validity of the printing is authenticated in a case where an authentication setting is made.

3. The printing apparatus as claimed in claim 2, wherein the print control unit performs the control for printing only in a case where an input password coincides with a pre-stored password.

4. A printing apparatus connectable to a first network and a second network and capable of performing a bidirectional data communication with a server computer connected to the first network and with a plurality of information terminals connected to the second network, comprising:

a printing unit configured to print an image on a printing medium based on externally input data;

a sending and receiving unit configured to send the server computer a request signal received from one of the plurality of information terminals and to receive content data sent, as a response to the request signal, from the server computer;

a print execution determining unit configured to determine, on the basis of a determination condition, whether the content data is to be printed;

a mode setting unit including a mode table storage unit configured to store a mode table showing correspondence of a print mode to information unique to each of the information terminals, wherein the mode setting unit sets one of the print mode and a non-print mode based on the mode table and information included in the request signal identifying the information terminal that sent the request signal; and a print control unit configured to cause the printing unit to print the content data in a case where the print execution determining unit determines that the content data is to be printed.

* * * * *